United States Patent [19]

Ellis

[11] Patent Number: 5,564,238

[45] Date of Patent: Oct. 15, 1996

[54] SAFETY GATE FOR A LOADING DOCK

[75] Inventor: Arthur S. Ellis, Brampton, Canada

[73] Assignee: Kelley Company, Inc., Milwaukee, Wis.

[21] Appl. No.: 248,710

[22] Filed: May 24, 1994

[51] Int. Cl.$^6$ ..................................................... E06B 9/62
[52] U.S. Cl. ............................................. 52/173.2; 49/447
[58] Field of Search .................................. 52/173.2, 202; 14/71.1; 49/63, 445, 447

[56] References Cited

U.S. PATENT DOCUMENTS

| | | |
|---|---|---|
| 1,832,812 | 11/1931 | Keenan . |
| 2,153,708 | 4/1939 | Belsher . |
| 2,237,106 | 1/1941 | Minert . |
| 3,174,721 | 3/1965 | Risser . |
| 3,375,625 | 4/1968 | Edkins et al. .......................... 52/173.2 |
| 3,528,086 | 9/1970 | Longer .................................. 52/173.2 |
| 4,494,341 | 1/1985 | Schwab ................................. 52/173.2 |
| 4,554,768 | 11/1985 | Srajer .................................... 52/173.2 |
| 5,271,183 | 12/1993 | Hahn et al. . |
| 5,299,386 | 4/1994 | Naegelli et al. . |

FOREIGN PATENT DOCUMENTS

| | | | |
|---|---|---|---|
| 2258193 | 5/1974 | Germany .............................. | 52/173.2 |

*Primary Examiner*—Carl D. Friedman
*Assistant Examiner*—Yvonne Horton-Richardson
*Attorney, Agent, or Firm*—Michael, Best & Friedrich

[57] ABSTRACT

A safety gate to be mounted on a loading dock. The safety gate includes a pair of vertical columns which are mounted on the floor of the dock on either side of a doorway that can be enclosed by an overhead door. A barrier or beam is mounted for sliding movement on the vertical columns and can be moved from an upper storage position where it is located above the doorway to a lower operative position where it extends across the doorway and will prevent material handling equipment, or other objects from accidentally passing through the doorway and falling to the driveway adjacent the dock. The barrier is composed of a pair of elongated side members which are connected by a pair of end members and a series of spaced transverse members. Each column is disposed in the space between an end member and the adjacent transverse member, and the outer surface of one of the side members facing the dock is provided with a resilient shock absorbing layer. The weight of the barrier is counterbalanced by a pair of counterweights that move within the hollow vertical columns, and the barrier is held in the lower position by a releasable latch.

20 Claims, 2 Drawing Sheets

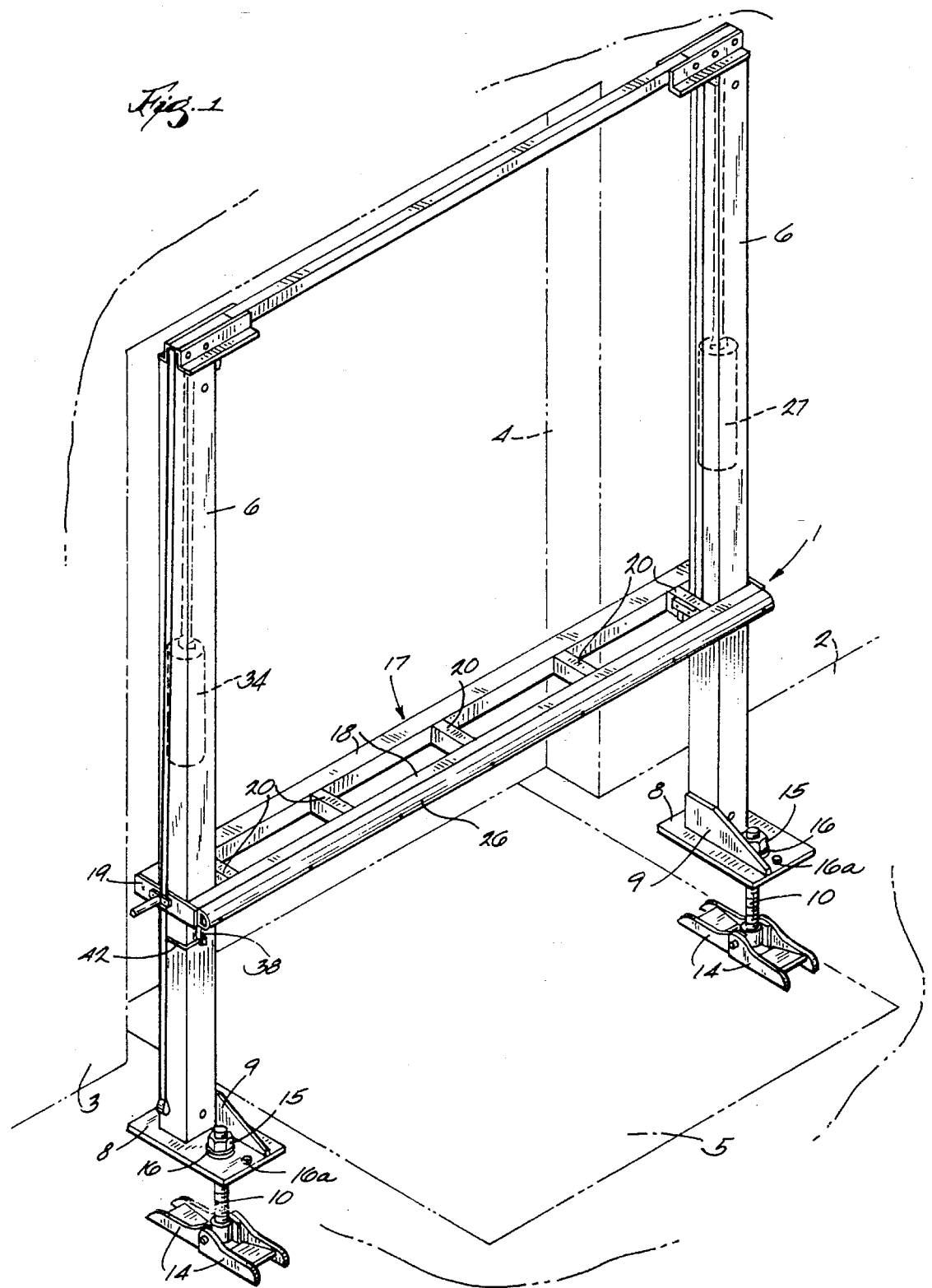

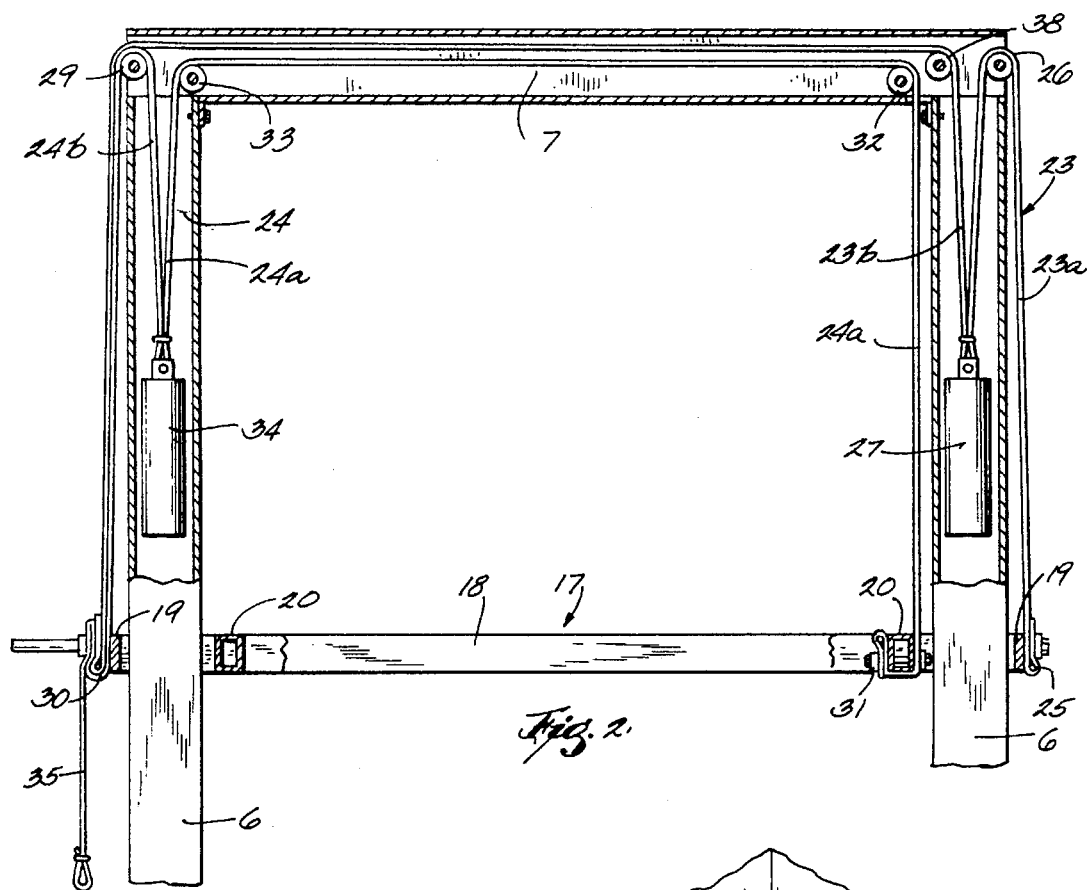
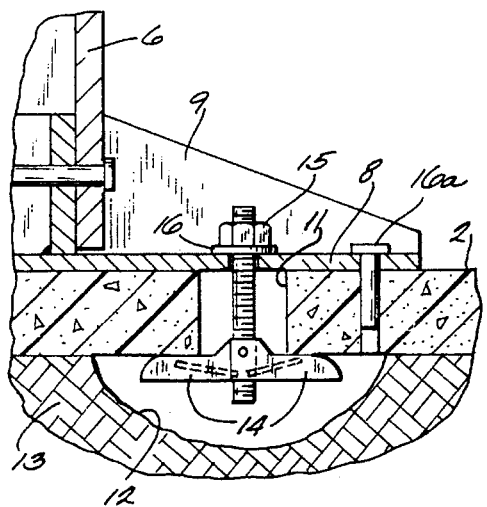
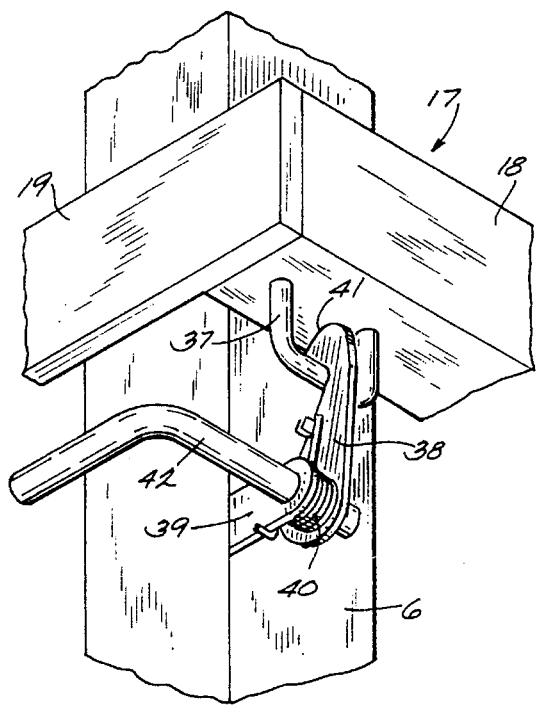

5,564,238

SAFETY GATE FOR A LOADING DOCK

BACKGROUND OF THE INVENTION

The typical loading dock includes one or more loading bays, each having a doorway which can be enclosed by an overhead door. In most loading docks, a dock leveler is mounted in the floor of the dock at each loading bay, and with a truck backed up to the loading bay, the dock leveler is operated to span the gap between the dock floor and the bed of the truck, so that material handling equipment, such as a fork lift truck, may conveniently move between the dock floor and the truck bed.

In many instances the overhead doors may be open or elevated when there is no truck at the loading bay. The dock floor is normally elevated above the driveway up to about 48 inches, and a fork lift truck maneuvering on the dock floor may accidentally back through the dock opening or doorway and fall onto the driveway, causing possible injury to the fork lift truck operator and/or damage to the equipment.

To prevent the accidental fall of material handling equipment or other objects through the doorway at the loading bay, it has been proposed to install safety gates at the loading bay to obstruct the doorway when the overhead door is in the elevated or open position. In order to withstand potential impact from a fork lift truck the gate must necessarily have substantial size and weight. One form of safety gate that has been utilized in the past, is mounted on the inside of the dock wall and one end of the gate is pivoted to a supporting post or column, so that the gate can be pivoted between a vertical storage position and a horizontal obstructing position. A second form of safety gate that has been employed in the past is mounted for vertical movement on a pair of vertical columns that are mounted on either side of the doorway in the loading bay. Due to the weight of the gate, which may be up to several hundred pounds, the gate is motor driven between the upper storage position and the lower operative position.

There has been a need for an inexpensive, lightweight, manually operated safety gate that is capable of withstanding substantial impact, if accidentally contacted by material handling equipment.

SUMMARY OF THE INVENTION

The invention is directed to an improved safety gate for a loading dock. The gate includes a pair of hollow vertical columns or posts which are mounted on the dock floor on either side of the opening or doorway in the loading bay. An elongated barrier or beam is mounted for movement on the vertical columns between an upper storage position, where the barrier is located above the doorway, and a lower operating position where the gate extends across the doorway and will prevent material handling equipment or other large objects from passing through the doorway to the driveway below.

The barrier is composed of a pair of elongated side members which are connected together by a pair of end members and a series of transverse members, so that the barrier has a ladder-like structure. The vertical columns are received within the spaces defined by each end member and the adjacent transverse member.

To cushion impact, the surface of the inner side member of the barrier facing the loading bay is provided with a resilient or compliant facing. The resilient facing serves to soften impact by spreading the force across a length of the barrier, and also cushions the effect of the impact on the occupant of the material handling equipment striking the barrier.

As a feature of the invention, a counterbalancing system is utilized to counterbalance the weight of the barrier and enable the barrier to be readily moved between the storage and operative positions by a loading dock attendant. In the preferred form of the invention, the counterbalancing system takes the form of a pair of counterweights, each movable within one of the vertical columns. A flexible member or strap is attached to each counterweight and each strap is attached to both ends of the barrier and passes over a pulley system located at the upper end of the safety gate frame. The dual counterweight and suspension strap system has the advantage that in the event one of the straps should fail, the remaining counterweight and suspension system will support the barrier so that counterbalance is not lost, thus preventing a rapid and uncontrolled descent of the barrier.

The invention also includes a novel mounting structure for the vertical columns when the safety gate is installed with an existing concrete slab. The lower end of each column is provided with a generally flat horizontal plate and each plate is connected to the concrete slab through a toggle bolt. Each toggle bolt extends through an opening in the concrete slab and into an enlarged chamber or cavity formed in the sub-soil beneath the slab. The lower end of each bolt is provided with a pair of wings which can be spread to an extended position, so that after the bolt is inserted through the opening in the slab, the wings are spread outwardly to a position where they will engage the lower surface of the slab. The upper end of each bolt is connected to the plate on the lower end of the column through a washer and nut arrangement.

The toggle bolt connection provides a firm securement of each column to the concrete slab and is capable of withstanding substantial impact. The anchoring system of the invention provides a more effective attachment of the columns to the concrete slab, as compared to the use of a number of small individual concrete fasteners, and is similarly effective to a system in which the lower ends of the columns are set in concrete.

The safety gate of the invention also includes a mechanism for holding or latching the barrier in the lower operative position. The latching mechanism includes a latch attached to one of the columns and the latch is spring biased to a latching position. As the barrier is manually lowered, the barrier will engage and wedge the latch outwardly to a released position and the latch will then snap back under the influence of the biasing spring to engage a loop or abutment on the barrier to hold the barrier in the lower position. To raise the barrier, the latch is manually released and the barrier can then be manually moved to the upper or storage position.

The invention, in its preferred form, provides an inexpensive manually operable safety gate. Due to the ladder-type construction, the barrier is of relatively light weight, and yet is capable of withstanding substantial impact without bending or deforming. The resilient bumper layer attached to the barrier aids in distributing impact and spreading the load, thus resisting bending or deformation of the barrier.

The counterbalancing system enables the barrier to be conveniently moved between the upper storage position and the lower operative position by the loading dock attendant, and thus eliminates the need of a more expensive power operated drive mechanism.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of the safety gate of the invention, as mounted on a loading dock.

FIG. 2 is a front elevation with parts broken away showing the attachment of the counterbalancing system to the barrier or beam;

FIG. 3 is a perspective view of the latching mechanism; and

FIG. 4 is an enlarged fragmentary vertical section showing the attachment of one of the columns to an existing concrete slab.

DESCRIPTION OF THE ILLUSTRATED EMBODIMENT

The drawings illustrate an improved safety gate 1 for a loading dock. As shown in FIG. 1, the safety gate 1 is mounted on the concrete floor or foundation 2 of the dock and the floor is normally located up to about 48 inches above a driveway, not shown, adjacent the loading dock.

The loading dock is provided with a vertical wall 3 having an opening or doorway 4 which can be enclosed by an overhead door, not shown. The loading dock can also include a dock leveler 5 which is mounted within a pit formed in the floor 2 of the loading dock. The dock leveler 5 acts in a conventional manner to span the gap between the floor 2 of the loading dock and the bed of a carrier or truck parked on the driveway adjacent the dock, so that material handling equipment, such as a fork lift truck, can conveniently pass between the floor 2 and the bed of the carrier.

Safety gate 1 includes a pair of hollow vertical columns 6 which are mounted on either side of the doorway 4 in wall 3. As illustrated, the columns 6 have a generally rectangular cross section, and the upper ends of columns 6 are connected together by an upper cross member or beam 7.

To attach the columns to the concrete floor or slab 2, a plate 8 is welded to the lower end of each column and a reinforcing gusset 9 connects the plate 8 with the column.

As best illustrated in FIG. 4, a toggle bolt 10 connects each plate 8 to the concrete slab 2. To provide the connection, a hole 11, which in practice may have a diameter of several inches, is initially drilled in the existing concrete slab 2 and a cavity 12 is dug in the sub-soil 13 with the cavity 12 being in alignment with hole 11. The toggle bolt 10 includes a pair of wings 14 which can be spread outwardly to an extended position. With the wings in the retracted position, the toggle bolt 10 is inserted through hole 11 and into the cavity 12, and the wings 14 are then moved to the extended position where the wings will engage the lower surface of slab 2, as nut 15 is turned down on the upper end of the bolt. A washer 16 can be interposed between nut 15 and plate 8, as shown in FIG. 4.

To prevent rotation of plates 8 and the attached columns 6 relative to the concrete slab 2, a positioning pin 16a is inserted through a hole in plate 8 and into an aligned hole in slab 2.

The toggle bolt connection provides a very strong and effective securement of columns 6 to the existing concrete slab 2, which will withstand substantial impact, as can occur if a fork lift truck should engage the safety gate. The toggle bolt attachment provides a more effective attachment than the use of a plurality of small individual concrete fasteners, and is similarly effective to a construction in which the lower end of the column is set in concrete.

While the toggle bolt attachment is particularly effective when the safety gate is installed on an existing concrete slab, it is contemplated that in a new construction with a poured concrete slab, conventional concrete anchors can be employed to anchor the columns into the poured slab.

Safety gate 1 includes an elongated barrier or beam 17 that is mounted for movement on vertical column 6 between an upper storage position, where the barrier is located above the doorway or opening 4, and a lower operative position where the barrier extends across the doorway at an elevation of about 36 inches above floor 2. Barrier 17, when in the operative position will prevent material handling equipment such as a fork lift truck, from accidentally falling through the doorway 4 to the driveway, while maneuvering on the dock floor.

Barrier 17 includes a pair of elongated side members 18 which are connected together by end members 19. In addition, a series of transverse members 20, which are parallel to end members 19 connect the two side members 18 together.

As best illustrated in FIG. 1, each column 6 is received in the space between an end member 19 and the adjacent transverse member 20, and this construction enables the barrier 17 to slide vertically on the columns 6.

As a feature of the invention, the surface or face of one of the side members 18 facing inwardly of the loading dock is provided with a resilient facing or bumper 21. As shown in FIG. 1, the bumper 21 has a generally D-shaped configuration.

Bumper strip 21, being formed of a resilient or compliant material, acts to distribute the impact across a length of the barrier, as well as softening the effect of the impact on the occupant of the material handling equipment that strikes the barrier.

As a feature of the invention, a counterbalancing system is employed to counterbalance the weight of the barrier 17. The counterbalancing system includes a pair of flexible members or straps 23 and 24, each of which is mounted or arranged to act as a pair of straps 23a and 23b, and 24a and 24b, respectively. One end of strap section 23a is dead-ended at 25 on one end of barrier 17, as shown in FIG. 2, and the strap section 23a then passes over a pulley 26 mounted for rotation on upper beam 7. The strap section 23a then passes downwardly from pulley 26 and is connected to an elongated counterweight 27 which is mounted for movement within one of the columns 6. Strap section 23b passes upwardly from counterweight 27 over a pulley 28 on cross beam 7, then over a pulley 29 on the opposite end of the cross beam and then downwardly where the strap section is dead-ended on the opposite end of barrier 17, as indicated by 30.

One end of the strap 24 section 24a is dead-ended, as shown by 31, on the barrier 17, and the strap section then passes upwardly around pulleys 32 and 33, which are mounted on cross beam 7 and then downwardly for attachment to a second counterweight 34, which is mounted for movement in the opposite column 6. Strap section 24b then passes upwardly from counterweight 34 around pulley 29 with strap 23b and is dead-ended at the opposite end of the barrier, as shown by 30. A pull strap 35 can be connected to the barrier 17 to enable the operator or loading dock attendant to pull the barrier downwardly from the storage position to the operative position.

As barrier 17 has substantial weight, the counterbalancing system facilitates manual movement of the barrier between the operative and storage positions. As each counterweight 27,34 is operably connected to each end of the barrier 17, the system is well balanced and a lesser load is imparted to each of the straps 23 and 24. In the event one of the straps 23 or 24 should fail, the other counterweight and suspension strap would provide some measure of counterbalance to prevent a rapid and uncontrolled descent of the barrier. Further, in the event one section of either strap 23 or 24 should fail, the barrier 17 will remain fully counterweighted, with the balance merely shifting to the other undamaged section of the strap.

As a feature of the invention, barrier 17 is automatically latched in the lower operative position. The latching mechanism, as best illustrated in FIG. 3, takes the form of a loop 37 which is mounted on one end of barrier 17. A latch 38 is pivoted to an end of a bracket 39 which extends outwardly from one of the columns 6 and a torsion spring 40 interconnects the bracket 39 and latch 38 and acts to bias the latch inwardly to a latching position. The upper end or head of latch 38 is provided with an inclined surface 41.

As the barrier 17 is lowered, loop 37 will engage the inclined surface 41 on latch 38, thereby wedging the latch outwardly and when the loop passes beneath the upper head of the latch, the torsion spring 40 will bias the latch inwardly, so that the latch will engage the loop, as illustrated in FIG. 3, to hold the barrier in the lowered position. A generally L-shaped arm 42 extends outwardly from the latch 38 and through movement of arm 42, the latch can be pivoted to a release position to thereby enable the barrier to be manually moved upwardly from the lower position to the upper storage position.

The ladder-type construction of barrier 17 provides strength for the barrier to resist bending, yet provides a relatively lightweight structure which can be manually moved upwardly with the aid of the counterbalancing system. The resilient bumper layer 21 acts to distribute the impact across a length of the barrier, thus aiding in preventing deformation of the barrier when impacted.

Various modes of carrying out the invention are contemplated as being within the scope of the following claims particularly pointing out and distinctly claiming the subject matter which is regarded as the invention.

I claim:

1. A safety gate for use with a loading dock having a dock floor, said safety gate comprising a supporting structure including a pair of spaced vertical columns, each disposed along a side of the loading dock, a barrier mounted for movement on the columns between an upper storage position where the barrier is located adjacent the upper end of the loading dock and a lower operating position where the gate is extendable across the loading dock, counterbalancing means operably connected to the barrier for counterbalancing at least a portion of the weight of said barrier, and releasable latch means for latching the barrier in position with respect to the columns.

2. The safety gate of claim 1, and including mounting means for mounting the lower end of each column to the floor of the loading dock.

3. The safety gate of claim 2, wherein said mounting means comprises a plate secured to the lower end of each column, and toggle bolt means interconnecting each plate with the floor.

4. The safety gate of claim 3, wherein the floor comprises a concrete slab and said toggle bolt means includes a bolt and a pair of pivotable wings extending outwardly from the inner end of the bolt and engageable with the undersurface of the slab.

5. The safety gate of claim 1, wherein said barrier includes a pair of horizontally spaced apart side members and a plurality of spaced transverse members connecting said side members.

6. The safety gate of claim 5, and including a layer of resilient material disposed on the outer surface of at least one of said side members.

7. The safety gate of claim 1, wherein said counterbalancing means comprises a pair of flexible members, one end of each flexible member attached a first portion of said barrier and a second end of each flexible member attached to a second portion of said barrier spaced from said first portion, pulley means on the supporting structure to support each flexible member, and a counterweight operably connected to each flexible member.

8. The safety gate of claim 7, wherein each flexible member comprises a strap.

9. The safety gate of claim 7, wherein said supporting structure includes a cross beam connecting the upper ends of said columns, said pulley means being mounted for rotation on said cross beam.

10. A safety gate for use with a loading dock having a floor, said safety gate comprising a supporting structure including a pair of spaced vertical columns each disposed along a side of the loading dock, an upper member connecting the upper ends of the vertical columns, a barrier mounted for movement on the columns between an upper storage position where the barrier is located adjacent the upper end of the loading dock and a lower operating position where the barrier extends across the loading dock, counterbalancing means operably connected to the barrier for counterbalancing at least a portion of the weight of said barrier, said counterbalancing means including a pair of flexible members, one end of each flexible member attached to one end of the barrier and a second end of each flexible member attached to the other end of the barrier, pulley means mounted at the upper member to support each flexible member, and a counterweight connected to each flexible member.

11. The safety gate of claim 10, wherein said pulley means comprises a first pulley, a second pulley, and a third pulley disposed above the first end of the barrier and said pulley means includes a fourth pulley, and a fifth pulley, disposed above the second end of the barrier, said first flexible member passing over said first pulley and then being connected to said first counterweight and then passing over said second pulley and said fifth pulley and then connected to the second end of said barrier, said second flexible member connected to the first end of said barrier and then passing upwardly over said third pulley and downwardly over said fourth pulley for connection to said second counterweight and then upwardly over said fifth pulley and then downwardly for connection to the second end of said barrier.

12. The safety gate of claim 11, wherein said columns are hollow and said counterweights are disposed for movement within the respective columns.

13. The safety gate of claim 10, wherein said flexible members are straps.

14. A safety gate for use with a loading dock having a floor, said safety gate comprising a supporting structure including a pair of spaced vertical columns each disposed along a side of the loading dock, a barrier mounted for movement on the columns between an upper storage position where the barrier is located adjacent the upper end of the loading dock to a lower operating position where the gate extends across the loading dock, said barrier comprising a pair of horizontally spaced apart side members and a plurality of spaced transverse members connecting said side members.

15. The safety gate of claim 14, and including a resilient strip disposed on a surface of one of said side members facing inwardly of the loading dock.

16. The safety gate of claim 14, and including counterbalancing means operably connected to the barrier for counterbalancing at least a portion of the weight of said barrier.

17. In combination, a loading dock including a floor, a pair of vertical columns supported on the floor and located on either side of the loading dock, a barrier mounted for movement on the columns between an upper storage position and a lower operating position where said barrier extends across the loading dock, said floor comprising a concrete slab, and mounting means for mounting the lower end of each column to said slab, said mounting means comprising a plate on the lower end of each column, and toggle bolt means interconnecting the plate with the undersurface of said slab.

18. The combination of claim 17, wherein said toggle bolt means comprises a bolt extending through aligned holes in said plate and said slab, a pair of wings pivoted on the lower end of the bolt and having an extended position in which the wings project outwardly from the bolt and engage the undersurface of said slab.

19. The safety gate of claim 14, wherein said columns are positioned between said side members.

20. The safety gate of claim 14, wherein said barrier further comprises a pair of end members connecting the ends of said side members, wherein each column is disposed in a space between an end member and an adjacent transverse member.

\* \* \* \* \*